United States Patent
Nakakoji et al.

(10) Patent No.: US 7,752,663 B2
(45) Date of Patent: Jul. 6, 2010

(54) LOG ANALYSIS SYSTEM, METHOD AND APPARATUS

(75) Inventors: Hirofumi Nakakoji, Yokohama (JP); Masato Terada, Kawasaki (JP); Kenichi Sakamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 1161 days.

(21) Appl. No.: 11/271,798

(22) Filed: Nov. 14, 2005

(65) Prior Publication Data

US 2006/0259968 A1 Nov. 16, 2006

(30) Foreign Application Priority Data

May 12, 2005 (JP) ............................. 2005-139865

(51) Int. Cl.
G06F 12/14 (2006.01)
(52) U.S. Cl. ......................................................... 726/22
(58) Field of Classification Search ........................ None
See application file for complete search history.

(56) References Cited

U.S. PATENT DOCUMENTS

2006/0037075 A1* 2/2006 Frattura et al. ................ 726/22

FOREIGN PATENT DOCUMENTS

| JP | 2002-342276 | 11/2002 |
|---|---|---|
| JP | 2004-248205 | 9/2004 |
| JP | 2004-336130 | 11/2004 |
| WO | WO 2004/056063 | 7/2004 |

* cited by examiner

*Primary Examiner*—Brandon S Hoffman
(74) *Attorney, Agent, or Firm*—Antonelli, Terry, Stout & Kraus, LLP.

(57) ABSTRACT

An analysis unit which effectively detects incidents on the basis of events detected by a security unit such as an intrusion detection system (IDS) or a firewall (FW) installed in a network stores statistical information that is frequency-distributed information of event information obtained from the collection unit, frequency component information obtained by frequency-analyzing the statistical information and the result obtained by making analysis on the basis of the frequency component. The collection unit collects and normalizes event log information outputted by IDS or FW to be stored in an event database (DB). An alert notification unit includes an alert database (DB) for storing an alert instruction transmitted from the analysis unit and an alert notification destination and reports occurrence of incidents to a manager or the like in accordance with the instruction.

12 Claims, 14 Drawing Sheets

FIG.8

ALERT NOTIFICATION INFORMATION

| ITEM EXAMPLE | CONTENTS EXAMPLE |
|---|---|
| NOTIFICATION DESTINATION | NETWORK MANAGER A |
| NOTIFICATION TIME | 2005/1/1 0:00 |
| OBJECT ANALYZED | DESTINATION PORT 135 |
| CONTENTS | ACCESSES IN ONE-DAY PERIOD IS INCREASED |
| RELATED ALERT | DESTINATION PORT 445 |

LOG ANALYSIS SYSTEM, METHOD AND APPARATUS

INCORPORATION BY REFERENCE

This application claims priority based on a Japanese patent application, No. 2005-139865 filed on May 12, 2005, the entire contents of which are incorporated herein by reference.

BACKGROUND

The present invention relates to a log analysis system, method and apparatus and more particularly to a log analysis system, method and apparatus for analyzing a state of incidents occurred in a network due to transmission of illegal packets or the like.

There is known a method of installing a security apparatus named a firewall (FW) or an intrusion detection system (IDS) as measures for detecting unauthorized access through a network. Further, a method is also known in which the security apparatuses are managed unitarily to analyze the pattern of logs collected by the security apparatuses and compare it with past cases to make it possible to detect incidents occurred in the network more exactly. The incident means the event occurred intentionally or accidentally in connection to the computer security.

JP-A-2002-342276, for example, discloses a technique relative to the intrusion detection system (IDS) as a prior art concerning the former detection method of the unauthorized access. JP-A-2004-336130, for example, discloses a technique of making analysis on the basis of comparison with a past model as a prior art concerning the latter method of analyzing the security event to improve the detection accuracy of incidents.

SUMMARY OF THE INVENTION

When incidents are to be detected and analyzed by the aforementioned prior arts, there is a tendency that it is difficult to detect incidents caused by a plurality of factors. That is, the aforementioned prior arts are effective to detect and analyze a single or a small number of attacks as incidents, although when a large number of attacks occur in overlapped manner, there is a problem that it is very difficult to produce an attack model and compare it with the attacks, so that effective detection and analysis of incidents are difficult.

The present invention provides a log analysis system, method and apparatus to solve the above problems in the prior arts. The present invention can detect incidents on the basis of events detected by a security apparatus such as the intrusion detection system (IDS) and the firewall (FW) installed in a network effectively.

The present invention provides a log analysis system, method and apparatus which can characterize event logs of the security unit that records one or plural attacks occurred in a network effectively to detect peculiar change therein so that complicated incidents hard to detect so far can be detected.

According to the present invention, the log analysis system for analyzing a state of incidents occurred in a network comprises a security unit, a collection unit and an analysis unit. The security unit includes means for detecting illegal packets flowing in the network and means for transmitting event information to the collection unit when illegal packets are detected. The collection unit includes means for obtaining the event information from the security unit to be stored in an event database, means for receiving an event obtainment request from the analysis unit to search the event database for the events having the specified conditions and means for transmitting the searched events to the analysis unit. The analysis unit includes means for transmitting the request for obtaining events occurred in a specified period and coincident with specified conditions to the collection unit, means for analyzing the event information obtained from the collection unit in response to the request, an analysis database for storing information of the analyzed result, means for preparing event statistical information on the basis of the obtained event information, means for subjecting the prepared event statistical information to frequency analysis processing to prepare frequency component information including frequency information and strength information, and means for making analysis on the basis of the frequency component to judge occurrence tendency of incidents.

Further, according to the present invention, a log analysis method in a log analysis system for analyzing a state of incidents occurred in a network comprises a security unit, a collection unit and an analysis unit. The security unit detects illegal packets flowing in the network and transmitting event information to the collection unit when illegal packets are detected. The collection unit obtains event information from the security unit to be stored in an event database and receives an event obtainment request from the analysis unit to search the event database for event having specified conditions and transmit the searched event to the analysis unit. The analysis unit transmits a request for obtaining events occurred in a specified period and coincident with specified conditions to the collection unit, analyzes the event information obtained from the collection unit in response to the request to store information of the analyzed result in an analysis database, prepares event statistical information on the basis of the obtained event information, subjects the prepared event statistical information to frequency analysis processing to prepare frequency component information including frequency information and strength information, and makes analysis based on the frequency component to judge occurrence tendency of incidents.

Moreover, according to the present invention, a log analysis apparatus for analyzing a state of incidents occurred in a network comprises means for transmitting a request for obtaining events occurred in a specified period and coincident with specified conditions to a collection unit which obtains from a security unit event information which the security unit obtains by detecting illegal packets flowing in the network and stores the event information in an event database, means for analyzing the event information obtained from the collection unit in response to the request, an analysis database for storing information of the analyzed result, means for preparing event statistical information on the basis of the obtained event information, means for subjecting the prepared event statistical information to frequency analysis processing to prepare frequency component information including frequency information and strength information, and means for making analysis based on the frequency component to judge occurrence tendency of incidents.

As described above, incidents occurred by plural attacks overlapped one another or incidents occurred with difference in individual attack timings caused by influence such as time difference or habit in living can be characterized exactly to distinguish steadily occurred attack and suddenly occurred attack.

According to the present invention, it is possible to detect incidents hard to detect so far and decide and support the incident response.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 8 illustrates the format of alert notification information transmitted from the alert notification unit to a manager or user;

DETAILED DESCRIPTION OF THE EMBODIMENT

An embodiment of the log analysis system and method according to the present invention is now described with reference to the accompanying drawings in detail.

Figure 1:
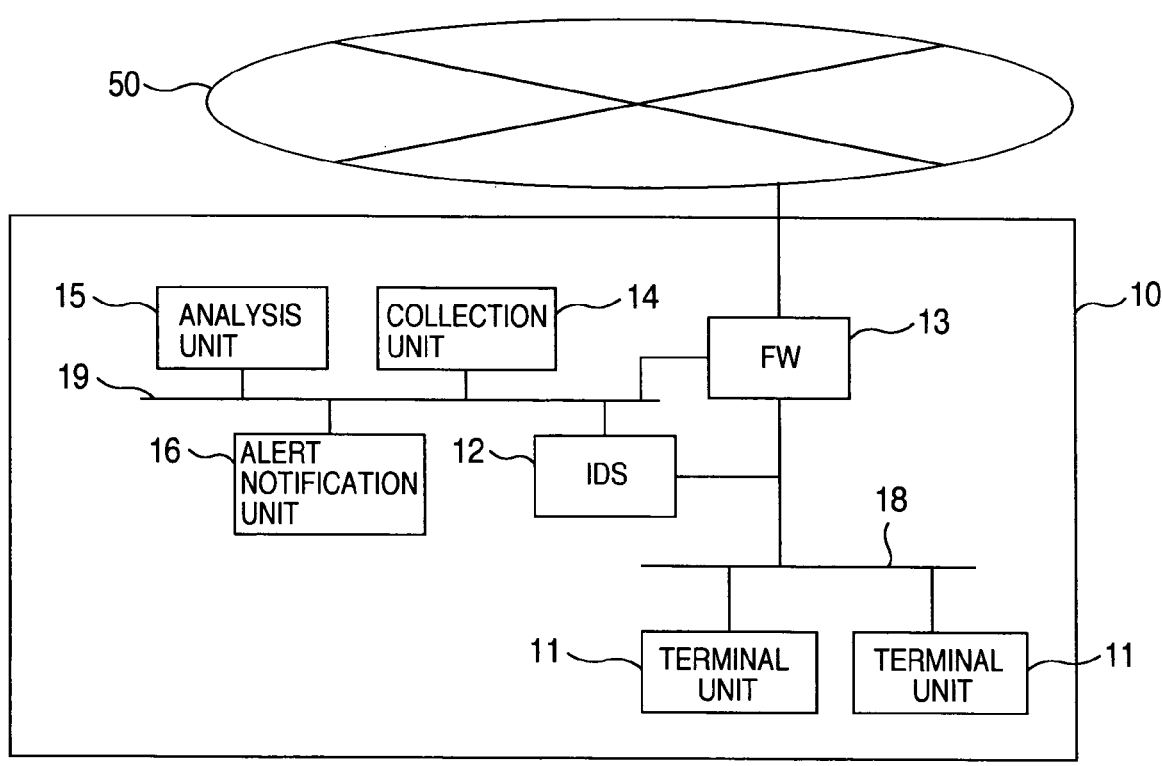
FIG. 1 is a block diagram schematically illustrating a log analysis system according to an embodiment of the present invention.

FIG. 1 is a block diagram schematically illustrating a log analysis system according to an embodiment of the present invention. In FIG. 1, numeral 10 denotes a log analysis system, 11 a terminal unit, 12 an intrusion detection system (IDS), 13 a firewall (FW), 14 a collection unit, 15 an analysis unit, 16 an alert notification unit, 18 a local area network, 19 a management network and 50 the Internet.

In the log analysis system 10 according to the embodiment of the present invention, a plurality of terminal units 11, the IDS 12 and the FW 13 are connected through the local area network 18 one another and the IDS 12, the FW 13, the collection unit 14, the analysis unit 15 and the alert notification unit 16 are connected through the management network 19 one another. The FW 13 is connected to the Internet 50 which is an external network. The hardware constituting the units 11 to 16 is substantially identical.

Figure 2:
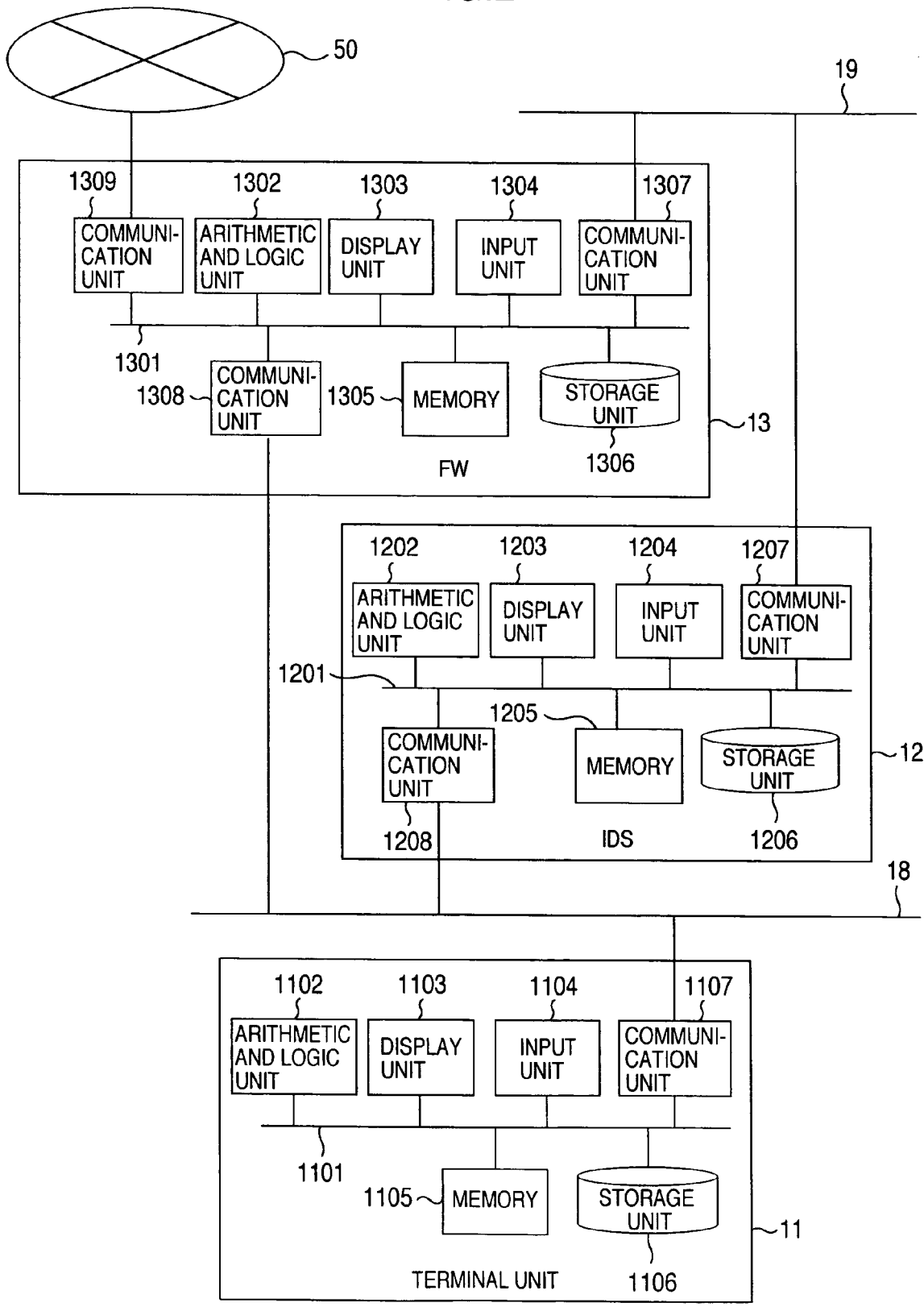
FIG. 2 is a block diagram illustrating a hardware configuration of a terminal unit, an intrusion detection system (IDS) and a firewall (FW)
Figure 3:
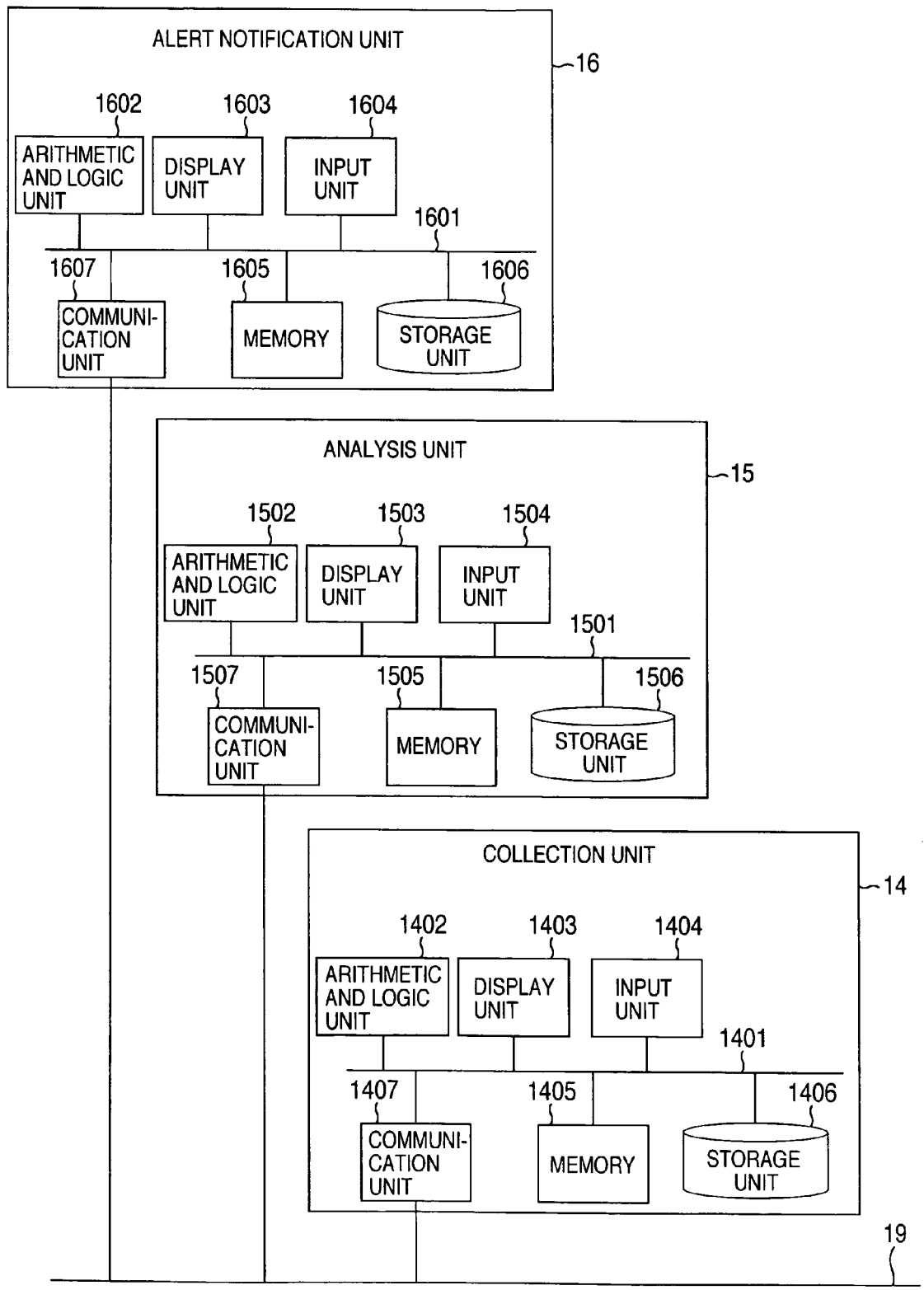
FIG. 3 is a block diagram illustrating a hardware configuration of a collection unit, an analysis unit and an alert notification unit.

FIG. 2 is a block diagram illustrating the hardware configuration of the terminal units 11, the IDS 12 and the FW 13. FIG. 3 is a block diagram illustrating the hardware configuration of the collection unit 14, the analysis unit 15 and the alert notification unit 16. The hardware configuration of the units 11 to 16 is now described.

The terminal unit 11 is a client such as a personal computer (PC) and includes an arithmetic and logic unit 1102, a display unit 1103, an input unit 1104, a memory 1105, a storage unit 1106 and a communication unit 1107, which are connected through a bus 1101 one another. The IDS 12 is to detect illegal packets flowing in the local area network 18 and includes an arithmetic and logic unit 1202, a display unit 1203, an input unit 1204, a memory 1205, a storage unit 1206 and communication units 1207 and 1208, which are connected through a bus 1201 one another. The FW 13 is to cut off specified packets at a connection portion of the Internet 50 and the local area network 18 and includes an arithmetic and logic unit 1302, a display unit 1303, an input unit 1304, a memory 1305, a storage unit 1306 and communication units 1307 to 1309, which are connected through a bus 1301 one another.

Further, as shown in FIG. 3, the collection unit 14 is to collect events produced by the IDS 12 or the FW 13 and includes an arithmetic and logic unit 1402, a display unit 1403, an input unit 1404, a memory 1405, a storage unit 1406 and a communication unit 1407, which are connected through a bus 1401 one another. The analysis unit 15 is to analyze events and includes an arithmetic and logic unit 1502, a display unit 1503, an input unit 1504, a memory 1505, a storage unit 1506 and a communication unit 1507, which are connected through a bus 1501 one another. The alert notification unit 16 is to notify analyzed result to other units through the management network 19 and includes an arithmetic and logic unit 1602, a display unit 1603, an input unit 1604, a memory 1605, a storage unit 1606 and a communication unit 1607, which are connected through a bus 1601 one another.

Figure 4:
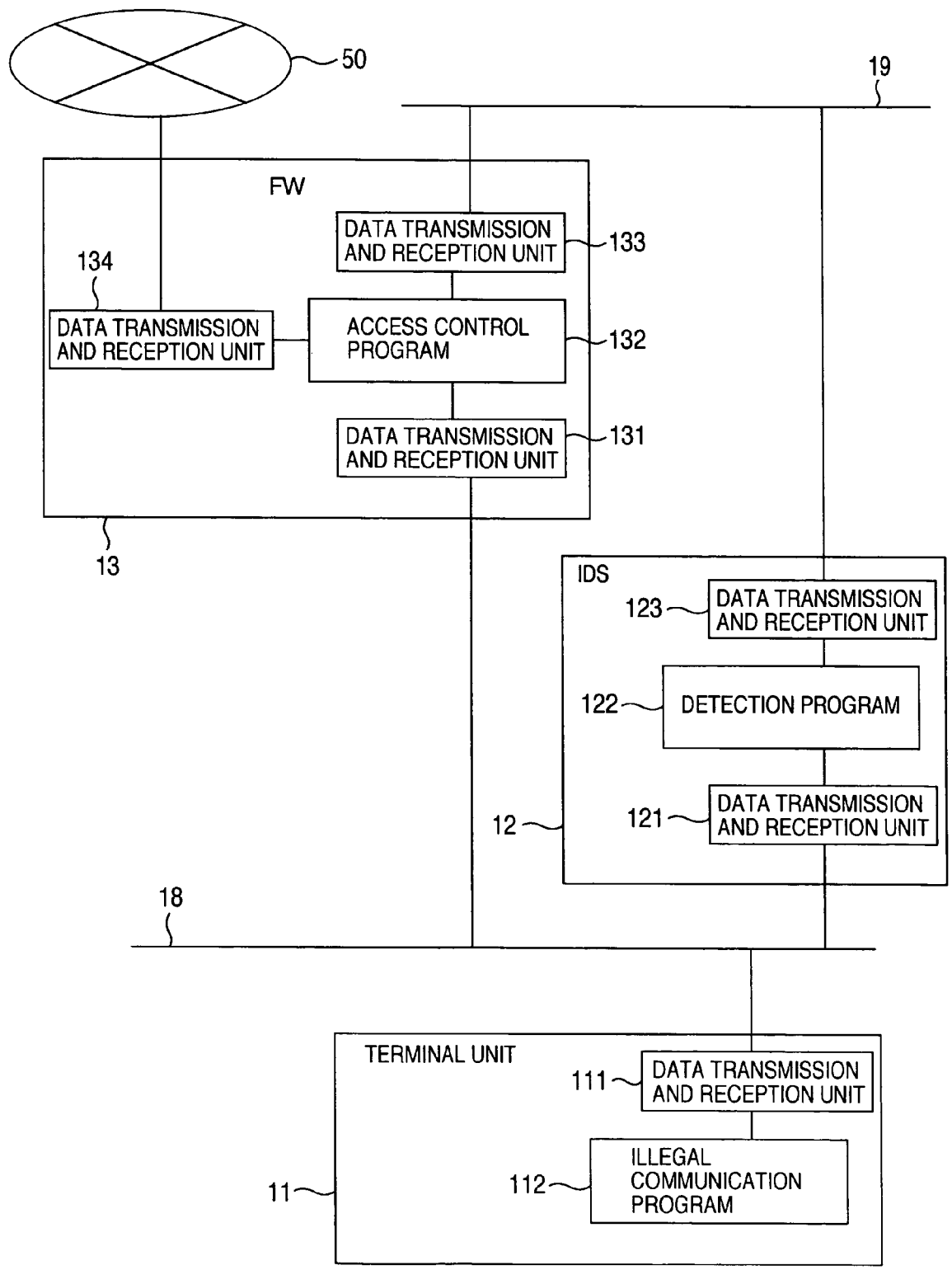
FIG. 4 is a block diagram illustrating a functional configuration of the terminal unit, the intrusion detection system (IDS) and the firewall (FW)
Figure 5:
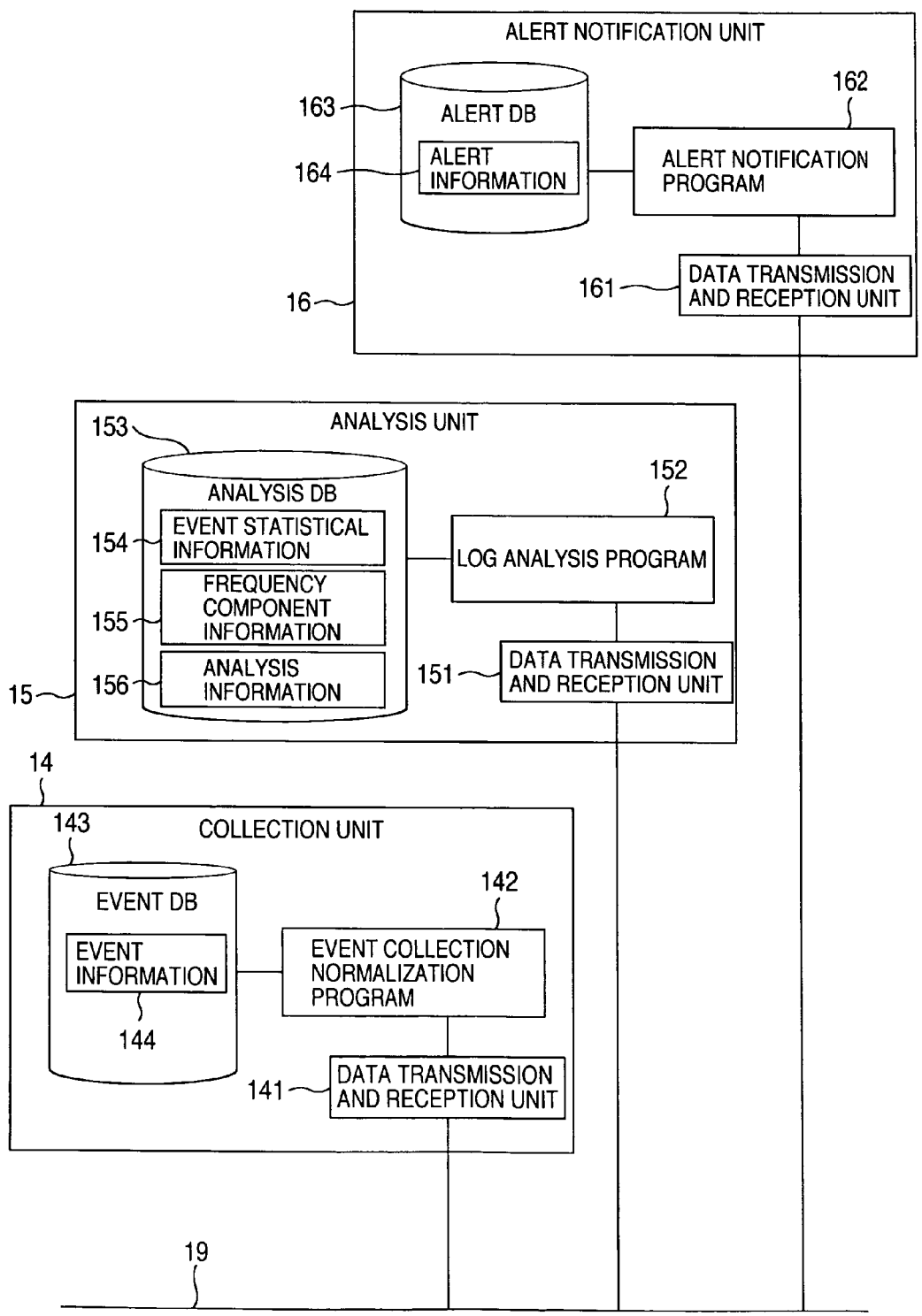
FIG. 5 is a block diagram illustrating a functional configuration of the collection unit, the analysis unit and the alert notification unit.

FIG. 4 is a block diagram illustrating the functional configuration of the terminal unit 11, the IDS 12 and the FW 13 and FIG. 5 is a block diagram illustrating the functional configuration of the collection unit 14, the analysis unit 15 and the alert notification unit 16. Referring now to FIGS. 4 and 5, the functional configuration of the units 11 to 16 and software information related to them are described.

The terminal unit 11 usually executes programs stored in the storage unit 1106 by the arithmetic and logic unit 1102 to thereby realize intended functions. One of the terminal units 11 in the embodiment of the present invention is to make illegal action and includes a data transmission and reception unit 111 which transmits and receives information between the local area network 18 and that and an illegal communication program 112 for controlling the data transmission and reception unit 111.

The illegal communication program 112 is a program that transmits illegal packets onto the network by virus, worm and unauthorized access. The illegal action performed by the terminal unit 11 is detected by the FW 12 or the IDS 12. Further, there is the possibility that the terminal units 11 which perform such illegal action are scattered even in networks of every country in the world connected to the Internet 50 besides the local area network.

The IDS 12 detects illegal packets flowing in the local area network 18 and issues an event for notifying abnormality. As shown in FIG. 4, the IDS 12 includes a data transmission and reception unit 121 for receiving packets flowing in the local area network 18, a data transmission and reception unit 123 for judging whether the packets are illegal or not and transmitting an event for notifying abnormality to the collection unit 14 when illegal packets are detected, and a detection program 122 for controlling these units.

The FW 13 has the function for dropping (cutting off) or accepting (passing) packets conformable to specified conditions out of packets passing through networks mutually between the local area network 18 and the Internet 50. As shown in FIG. 4, the FW 13 includes a data transmission and reception unit 134 for receiving communication data transmitted from the Internet 50 to the local area network 18 or transmitting communication data from the local area network 18 to the Internet 50, a data transmission and reception unit 131 for transmitting communication data from the Internet 50 to the local area network 18 or receiving communication data transmitted from the local area network 18 to the Internet 50, a data transmission and reception unit 133 for transmitting the communication state to the collection unit 14 as events, and an access control program 132 for controlling the units.

The collection apparatus 14 includes, as shown in FIG. 5, a data transmission and reception unit 141 for making transmission and reception of event information obtained from the IDS 12 or the FW 13, event obtainment result responsive to an event obtainment request of the analysis unit 15 and the like, an event database (DB) 143 for normalizing events to be stored, and an event collection normalization program 142 for controlling the units. The collection unit 14 searches the event database for a relevant event in response to the event obtainment request of the analysis unit 15 and returns the event obtainment result to the analysis unit 15. The database 143 is formed within the storage unit 1406 and event information 144 stored in the event database 143 is information normalized of one or a plurality of events obtained from the IDS 12 or the FW 13 into a common format. Format examples of the event information and the event obtainment request will be described later.

The analysis unit 15 includes, as shown in FIG. 5, an analysis database (DB) 153 for storing analyzed result of the event information obtained from the collection apparatus 14, a data transmission and reception unit 151 for transmitting and receiving the event obtainment request, the event obtainment result, an alert notification instruction and the like, and a log analysis program 152 for controlling the units. Stored in the analysis database 153 are event statistical information 154 that is event subjected to conversion-into-histogram-expressible-information or frequency-distribution in the time series manner on the basis of the event obtainment result obtained from the collection unit 14, frequency component information 155 that is the statistical information converted into a frequency component, and analysis information 156 which is accumulated information of the result analyzed on the basis of the frequency component information. The analysis database 153 is formed within the storage unit 1506 and the information stored therein will be described later in detail.

The alert notification unit 16 includes, as shown in FIG. 5, an alert database (DB) 163 for storing alert information 164 such as the alert notification instruction received from the analysis unit 15 and notification destination information, a data transmission and reception unit 161 for transmitting and receiving alert notification instruction, alert notification and the like, and an alert notification program 162 for controlling the units. The alert database 163 is formed within the storage unit 1606. The alert is information required to be notified to a manager or user when it is judged that the severity is high as a result of analysis. The alert information is transmitted to the manager or user by means of a communication method such as mail and WEB and will be described later in detail.

Figure 6:
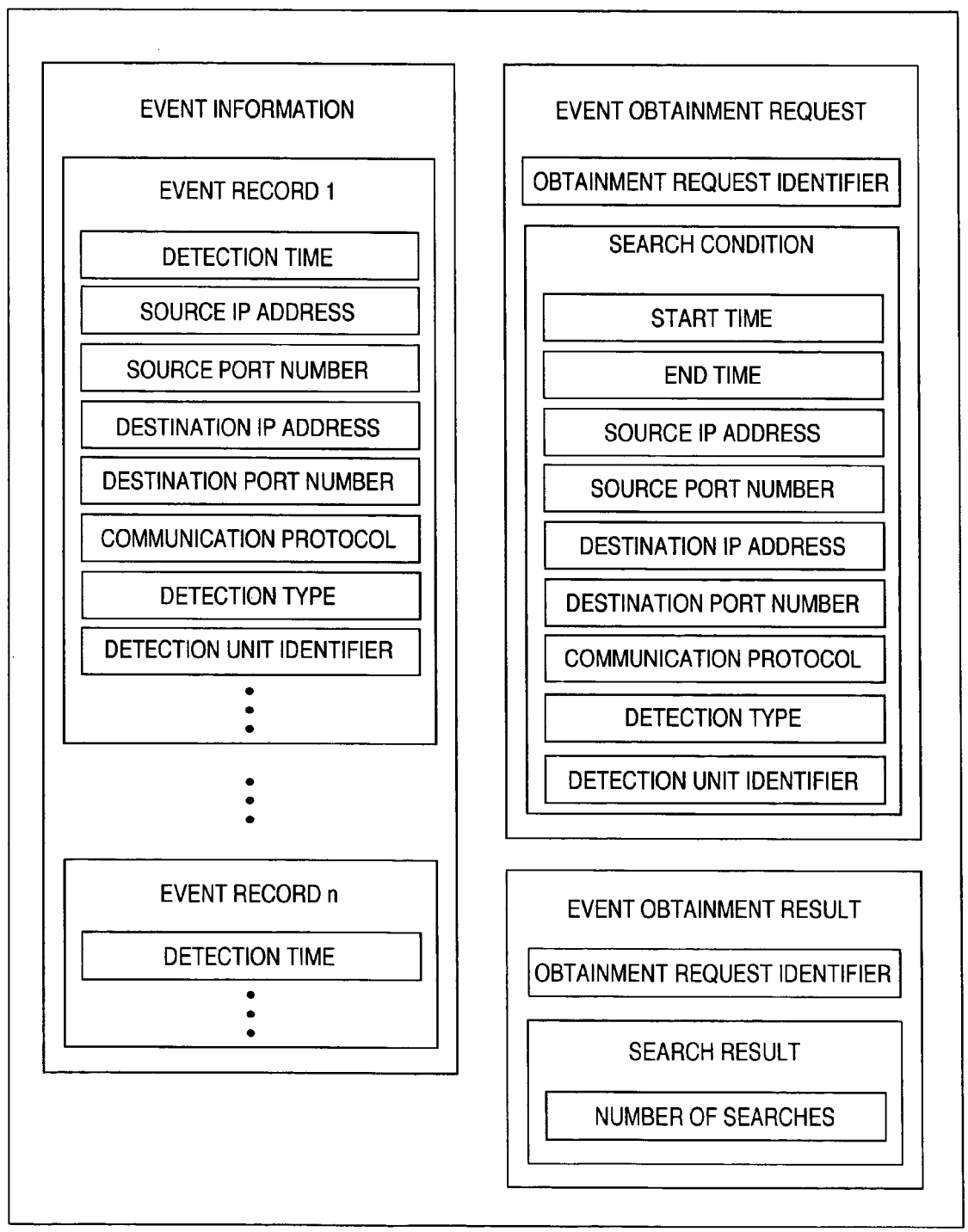
FIG. 6 illustrates the formats of event information stored in an event database (DB) of the collection unit, an event obtainment request transmitted from the analysis unit to the collection unit and event obtainment result transmitted from the collection unit to the analysis unit in response to the event obtainment request.

FIG. 6 shows the formats of the event information 144 stored in the event database 143 of the collection unit 14, the event obtainment request transmitted from the analysis unit 15 to the collection unit 14 and the event obtainment result transmitted from the collection unit 14 to the analysis unit 15 in response to the event obtainment request.

The event information 144 stored in the event database 143 of the collection unit 14 includes, as shown in FIG. 6, for example, event detection time, source IP address, source port number, destination IP address, destination port number and communication protocol of packets relating to event, detection type indicative of a kind of illegality, detection unit identifier for identifying detected unit and the like for each event. In the embodiment of the present invention, since packets transmitted by the illegal communication program 112 of the terminal unit 11 are detected by the IDS 12 and the IDS 12 transmits an event to the collection unit 14, the collection unit 14 receives it and stores detection time by IDS 12 of the packets transmitted by the illegal communication program 112, IP address of the terminal unit 11, port number of the terminal unit 11, destination IP address to which the terminal unit 11 transmits the illegal packets, destination port number and the like to the event database 143.

The event obtainment request from the analysis unit 15 to the collection unit 14 includes, as shown in FIG. 6, obtainment request identifier for identifying the event obtainment request, occurrence period of the event to be searched for (start time and end time), source IP address, source port number, destination IP address, destination port number, protocol, detection type and detection unit identifier recorded in the event. Further, the event obtainment result that the collection unit 14 transmits the analysis unit 15 in response to the event obtainment request includes event request identifier of the event obtainment request that is the origin of the result, the number of searches of events conformable to the search conditions contained in the event obtainment request and the like.

Figure 7:
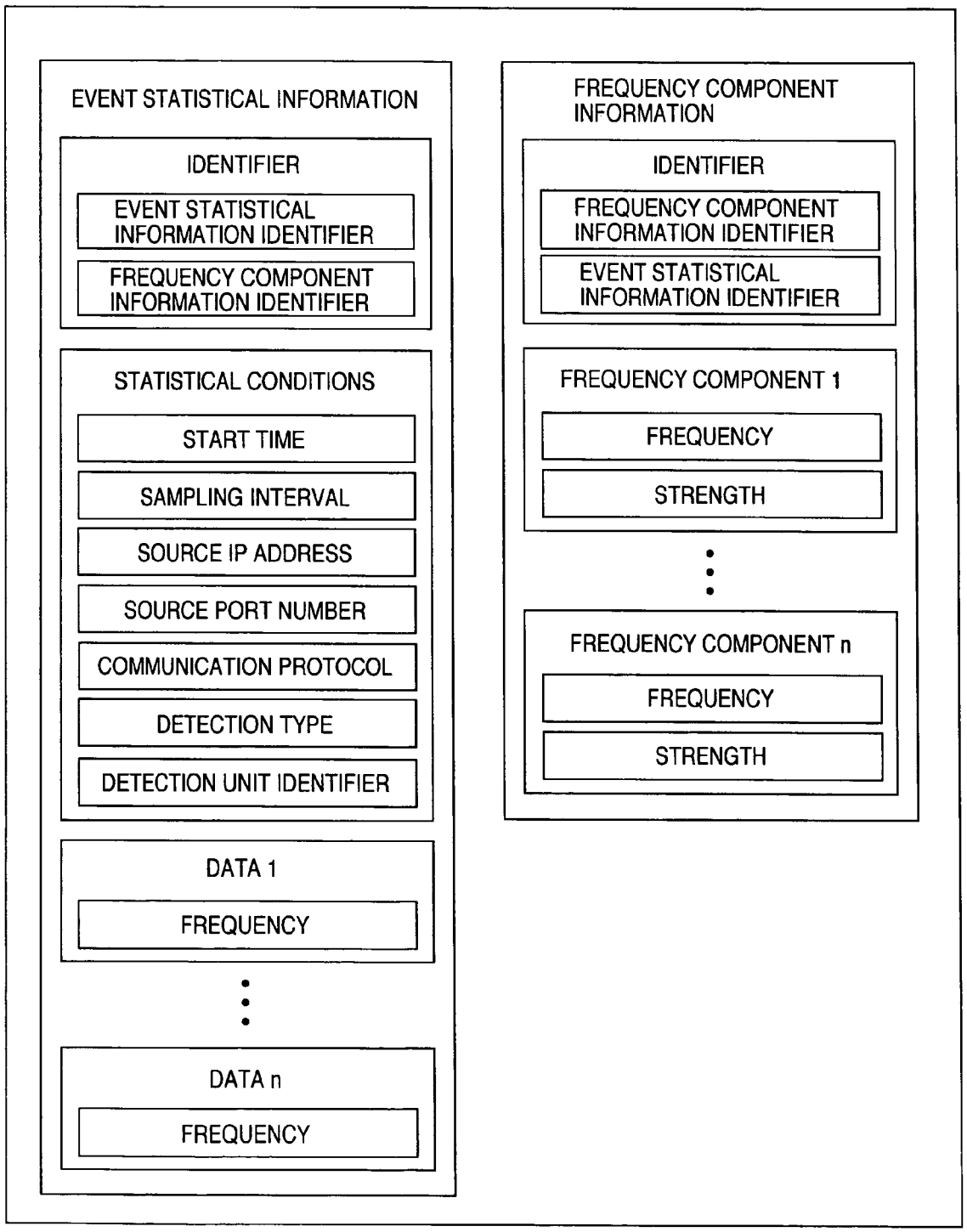
FIG. 7 illustrates the formats of event statistical information stored in an analysis database (DB) of the analysis unit and frequency component information that is statistical information converted into frequency component.

FIG. 7 shows the formats of the event statistical information 154 stored in the analysis database 153 of the analysis unit 15 and the frequency component information 155 that is the statistical information converted into the frequency component.

The analysis unit 15 frequency-distributes events in the time series manner on the basis of the event obtainment result obtained from the collection unit 14 to prepare the event statistical information 154. The frequency distribution is to convert data that each event such as the event information described in FIG. 6 is recorded as one record into the number of times (frequency) of events occurred in a predetermined period such as the event statistical information shown in FIG. 7. For example, event information in one day (24 hours) is frequency-distributed at intervals of one hours (that is, the sampling interval is one hour), so that the event information is converted into 24 data (the number of times of occurrence of events in respective periods). In the example shown in FIG. 7, the data are expressed as data 1 to data n, each data representing the frequency of occurrence of events. Further, the frequency component is to be obtained by frequency-analyzing the event statistical information as shown in FIG. 7 by means of the Fourier transformation method, for example, to be converted into sets of frequency components contained in the transition state of the frequency contained in the event statistical information and strength of the frequency components. For example, the event statistical information relating to incidents occurred at intervals of about one second is decomposed into the strong frequency component having the frequency of 1 Hz and the weak frequency component having other frequencies. In the example shown in FIG. 7, frequency components 1 to n each have frequency and strength.

In the embodiment of the present invention, the event information collected in the collection unit 14 is obtained and converted into the statistical information by execution of the analysis log program 152 of the analysis unit 15. The statistical information is frequency-analyzed by means of the Fourier transformation to generate the frequency component information for each statistical information. The analysis unit makes analysis on the basis of the frequency components, so that the analyzed result is displayed and the alert notification instruction is transmitted to the alert notification unit. In other words, the event information detected by the IDS 12 or the FW 13 is analyzed on the basis of the frequency components and deviation and change in frequencies are reported to the manager or user as the analyzed result.

FIG. 8 shows the format of the alert notification information transmitted by the alert notification unit 16 to the manager or user. As shown in FIG. 8, for example, the alert notification information includes alert notification destination, alert notification time, information of object to be analyzed, contents describing phenomenon of the information and other related alert in which it is analyzed that the same phenomenon occurs and the like.

Figure 9:
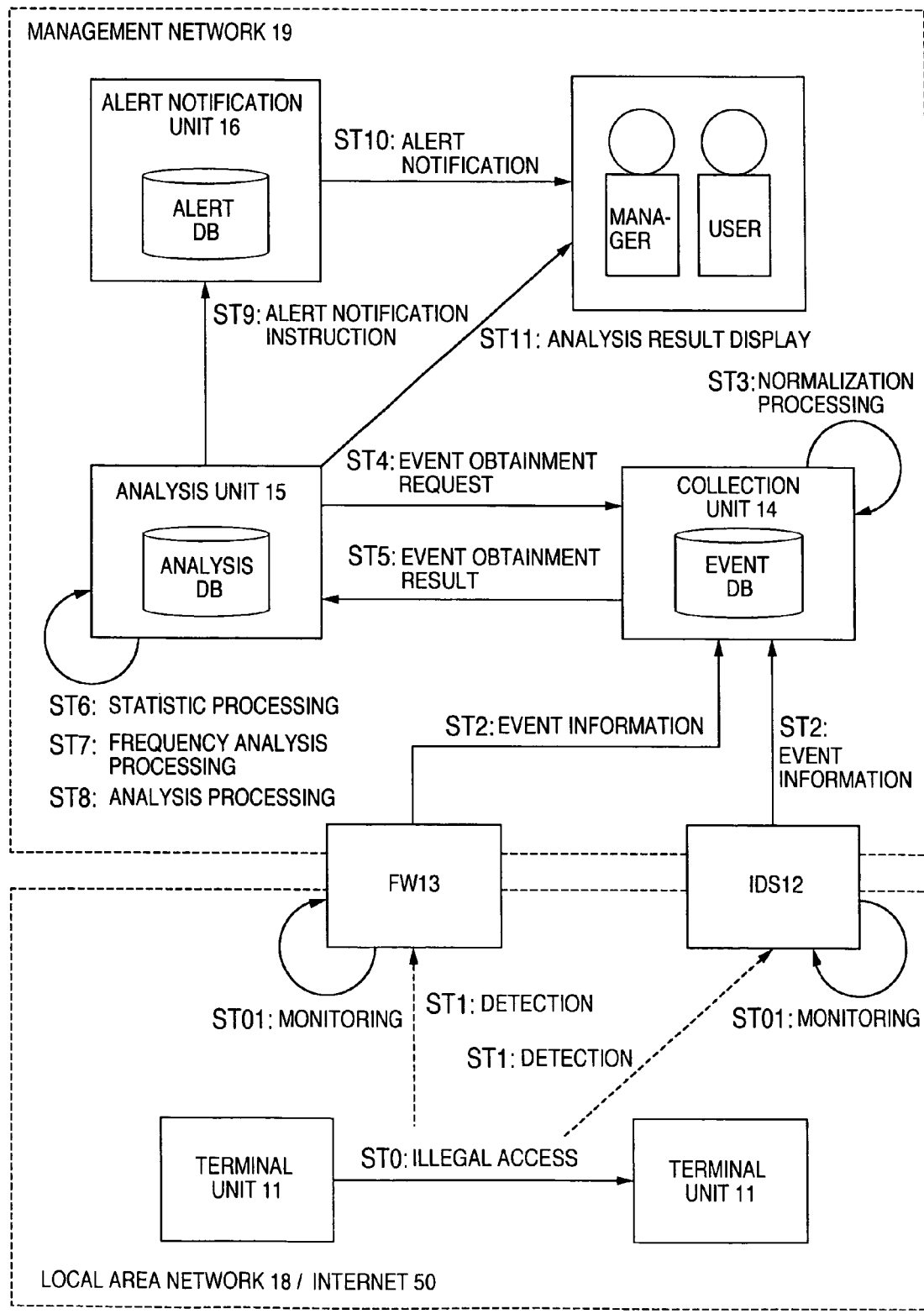
FIG. 9 is a schematic diagram illustrating operation of the log analysis system according to the embodiment of the present invention.

FIG. 9 illustrates the outline of operation of the log analysis system according to the embodiment of the present invention. The outline of operation is now described.

(1) The terminal unit 11 which performs illegal action transmits illegal packets to another terminal unit 11 through the local area network 18 or the Internet 50 by execution of the illegal communication program 112 and attacks it (ST0).

(2) The IDS 12 and the FW 13 execute the detection program 122 and the access control program 132, respectively, in parallel or successively to thereby monitor packets flowing in the local area network 18 or the Internet 50 (ST01).

(3) The illegal packets flowing in the local area network 18 or the Internet 50 are detected by monitoring by the IDS 12 or the FW 13 (ST1).

(4) The IDS 12 or the FW 13 which has detected the illegal packets transmits event information to the collection unit 14 successively or periodically (ST2).

(5) The collection unit 14 collects the event information from the IDS 12 or the FW 13 and executes the event collection normalization program 142 to normalize the event information to the common format as described in FIG. 6 and store it in the event database 143 (ST3).

(6) The collection unit 14 executes the log analysis program 152 to thereby transmit the event obtainment request as described in FIG. 6 to the collection unit 14 successively or periodically (ST4).

(7) When the collection unit 14 receives the event obtainment request transmitted in ST4, the collection unit 14 obtains information concerning events satisfying the event obtainment request from the event database 143 and transmits the information to the analysis unit 15 as the event obtainment result as described in FIG. 6 (ST5).

(8) The analysis unit 15 receives the event obtainment result from the collection unit 14 and converts it into the event statistical information as described in FIG. 7 to be stored in the analysis database 153. Further, the analysis unit 15 takes out the event statistical information 154 from the analysis database 153 successively or periodically and frequency-analyzes it by means of the Fourier transformation to be stored in the analysis database 153 as the frequency component information as described in FIG. 7 (ST6, ST7).

(9) The analysis unit 15 further extracts such frequency component information as having specific frequency with increased strength and similar frequency component out of the frequency component information 155 stored in the analysis database 153 and stores it in the analysis database 153 as the analysis information as described later in FIG. 14, for example (ST8).

(10) Thereafter, the analysis unit 15 transmits to the alert notification unit 16 the alert notification instruction such as the alert notification information described in FIG. 8 in accordance with alert notification conditions previously set on the basis of the analysis information 156 (ST9).

(11) The alert notification unit 16 stores the alert notification instruction received from the analysis unit 15 in the alert database 163 and notifies an alert to the manager or user by means of the communication method such as WEB and mail periodically or successively (ST10).

(12) The analysis unit 15 transmits contents of the analysis database 153 to the manager or user in parallel with transmission of the alert notification instruction or successively to be open to the public (ST11).

Before processing operation of the units of the log analysis system according to the embodiment of the present invention is described, the network configuration and the property of worms W are first described as a premise of the processing operation.

Figure 10:
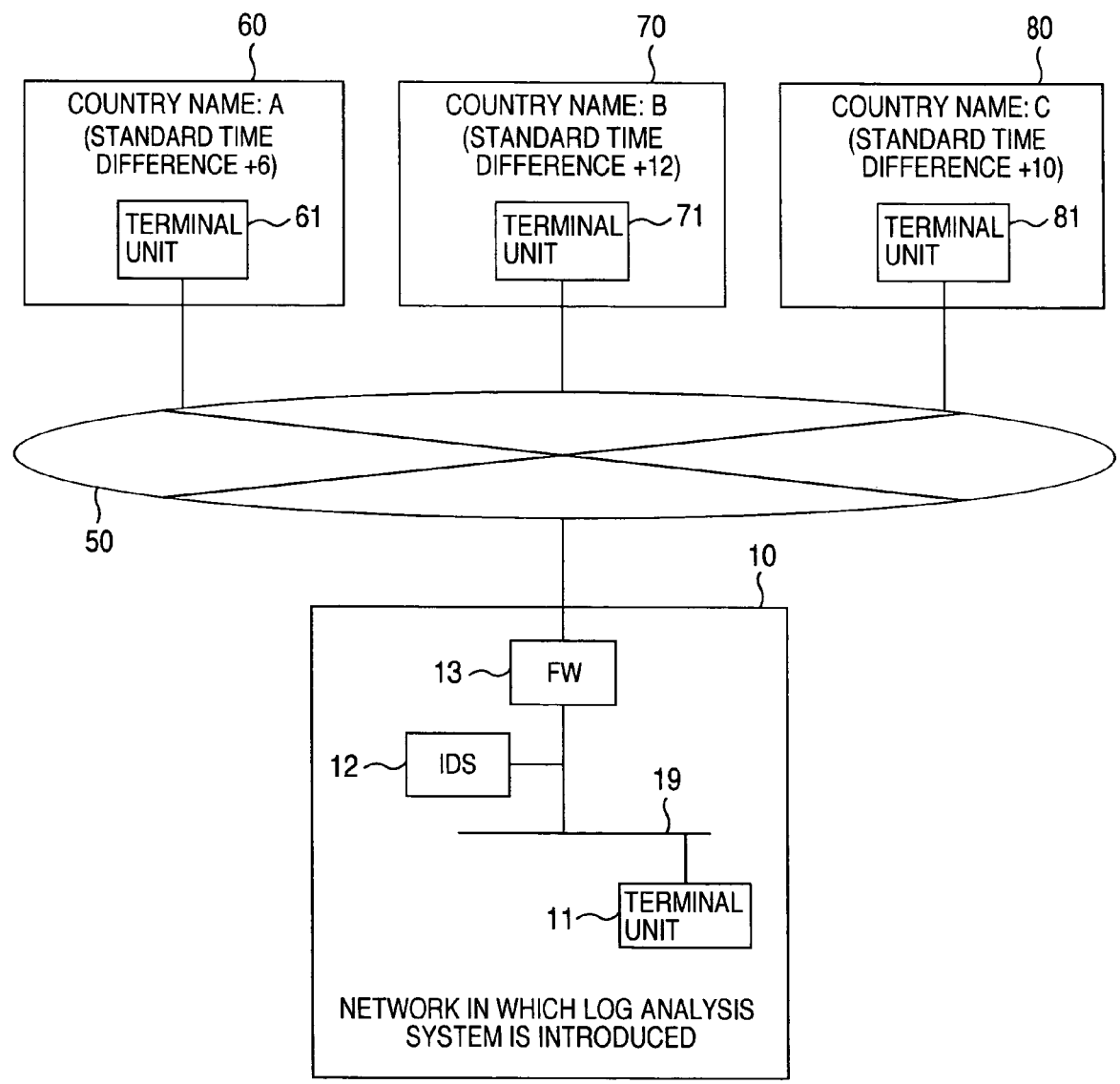
FIG. 10 is a block diagram illustrating a network configuration as a premise for explaining operation of the units in the log analysis system.

FIG. 10 is a block diagram illustrating the network configuration as a premise for explaining operation of the units in the log analysis system and FIGS. 11A to 11F illustrate the property of worms W as a premise for explaining operation of the units in the log analysis system. In FIG. 10, numerals 60, 70 and 80 denote countries A, B and C, respectively, numeral 61, 71 and 81 denote terminal units and other numerals designate the same elements as those in FIG. 1.

Figure 11A:
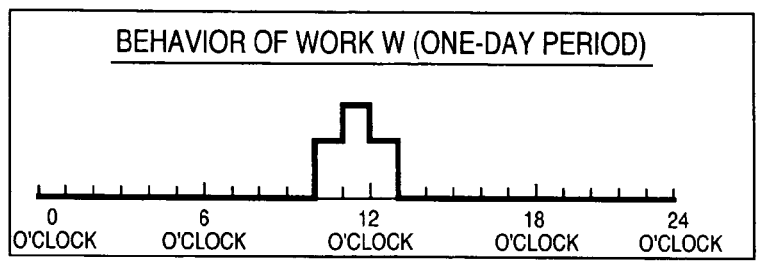
FIGS. 11A to 11F illustrate the property of worms W as a premise for explaining operation of the units in the log analysis system.

As shown in FIG. 10, it is supposed that the terminal units 61, 71 and 81 which exist in plural countries A 60, B 70 and C 80, respectively, and perform illegal action in the same manner as the terminal unit 11 described above are connected to the Internet 50. The terminal units 61, 71 and 81 each include the illegal program (worm W) which is operated in the same manner as the illegal communication program 112 of the terminal 11 and the worms W of the respective terminal units are to attack other terminal 11 from 10 a.m. at the local time in the respective countries as shown in FIG. 11A. Further, the time difference between the plural countries A 60, B 70 and C 80 and the country in which the log analysis system 10 according to the embodiment of the present invention is installed (the time in this country is the standard time) are +6, +12 and +10 hours, respectively.

Figure 11B:
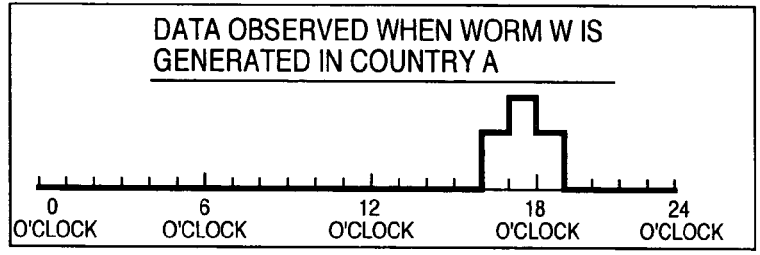
Figure 11C:
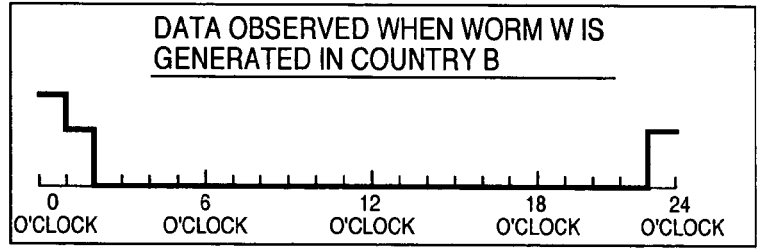
Figure 11D:
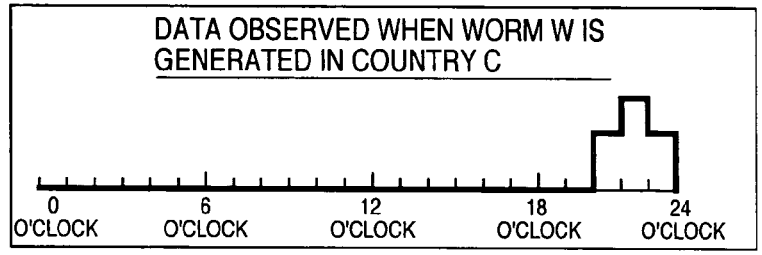
Figure 11E:
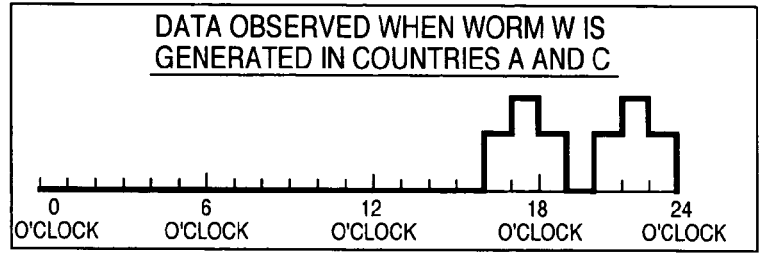
Figure 11F:
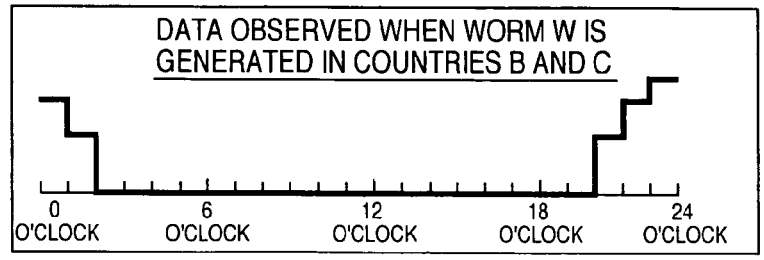

The attacks transmitted from the terminals 61, 71 and 81 reach the log analysis system 10 at different times due to the relation of the time difference, so that the worms transmitted from the terminal units 61, 71 and 81 are detected by the IDS 12 or the FW 13 at the time positions as shown in FIGS. 11B to 11D, respectively. When the terminal unit 61, 71 or 81 is operated alone, the worm is detected at the time position as shown in FIG. 11B, 11C or 11D, respectively. Further, when the terminal units 61 and 81 are operated, the worms having two large mountains as expressed in a graph are observed as shown in FIG. 11E by the IDS 12 or the FW 13. Similarly, when the terminal units 71 and 81 are operated, the worm having a single large mountain as expressed in a graph is observed as shown in FIG. 11F by the IDS 12 or the FW 13. In this manner, the graph having plural attacks overlapped is often expressed as a different graph even when attack by the same worm W is observed.

Figure 12:
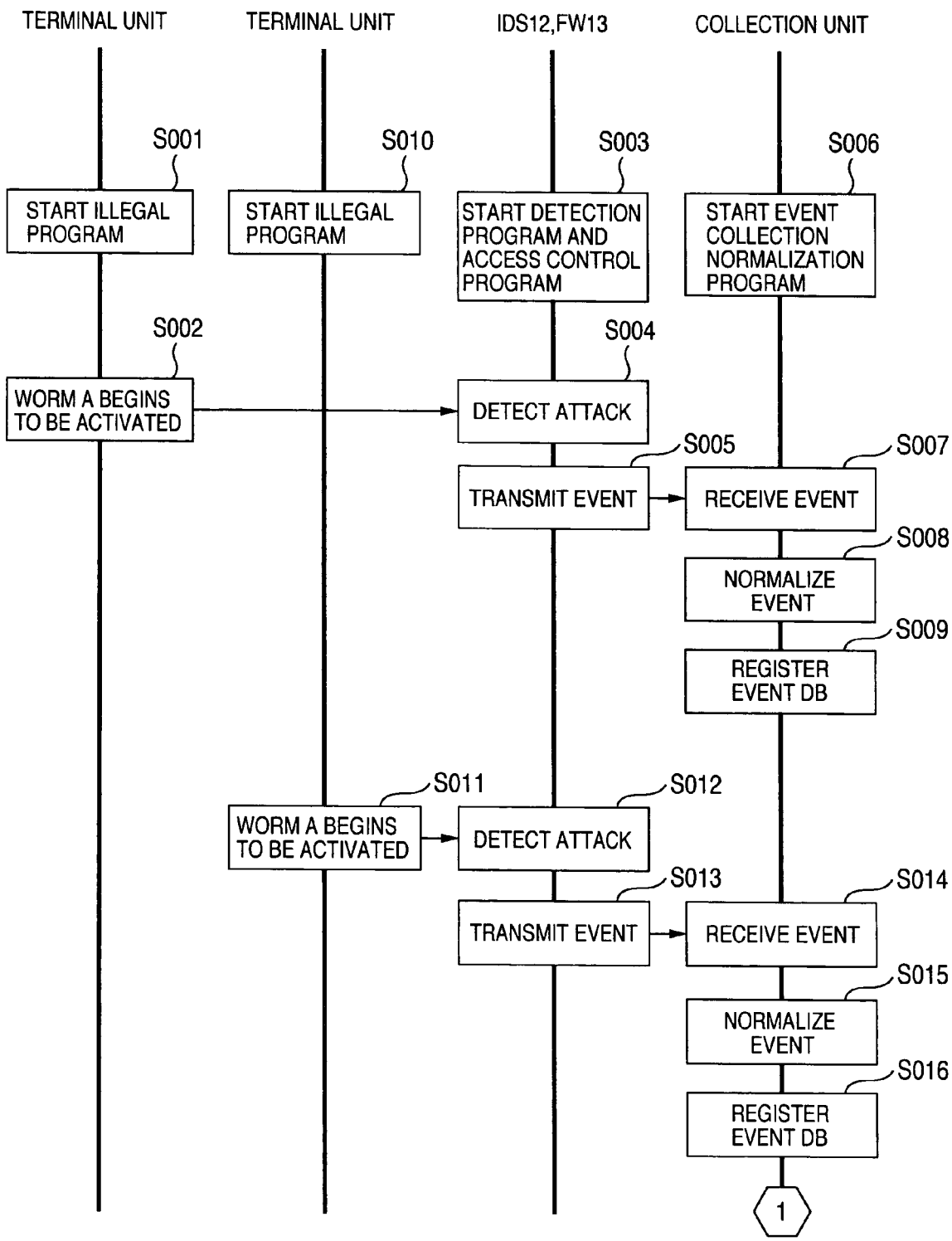
FIG. 12 is a flow chart (part 1) showing processing operation of the units in the log analysis system according to the embodiment of the present invention.
Figure 13:
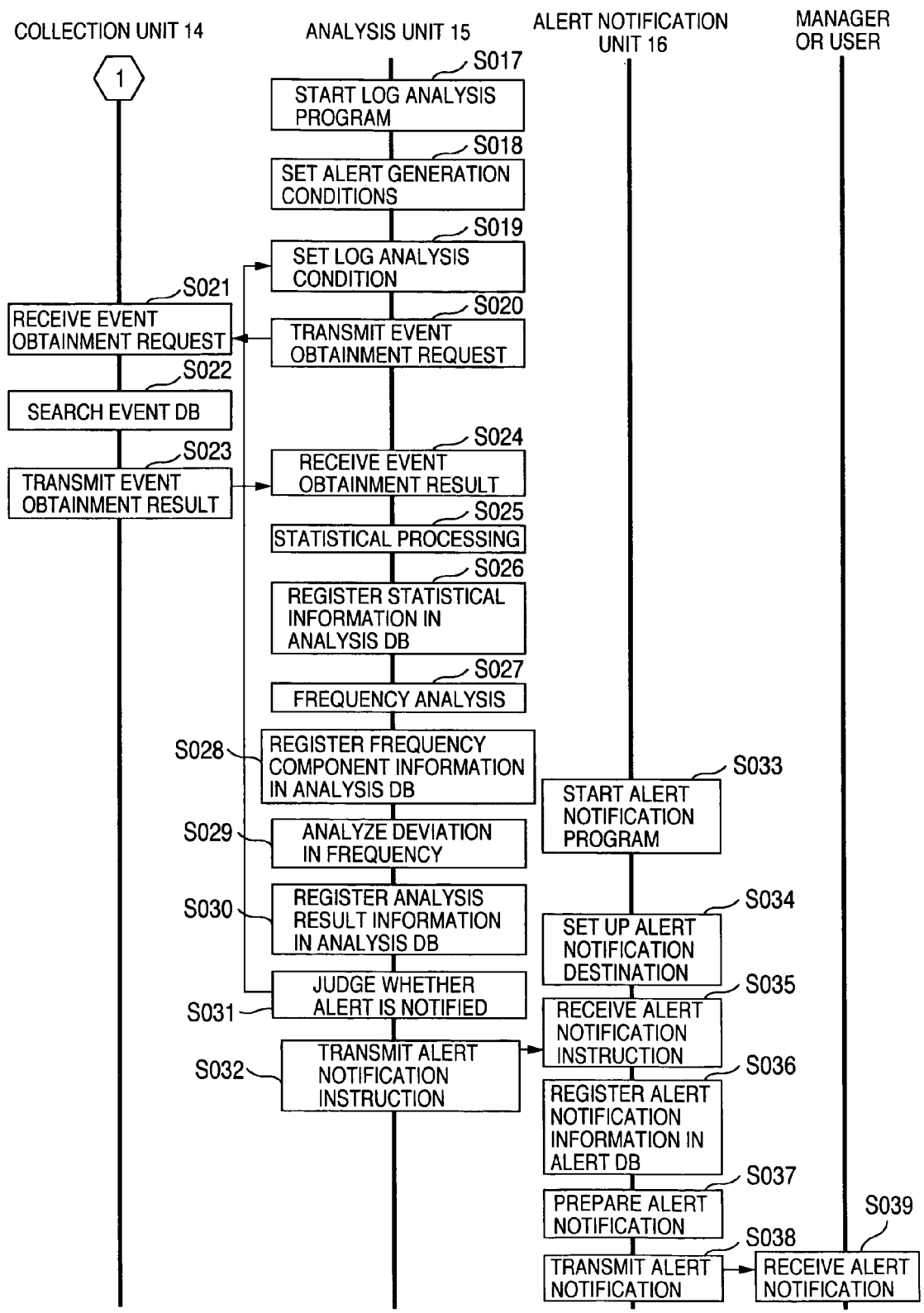
FIG. 13 is a flow chart (part 2) showing processing operation of the units in the log analysis system according to the embodiment of the present invention.

FIGS. 12 and 13 are flow charts showing processing operation of the units in the log analysis system according to the embodiment of the present invention. The processing operation is now described. The processing operation described here shows a processing example in case where the terminal units 61 and 81 are operated.

(1) First of all, it is supposed that the terminal unit 61 installed in the country A 60 starts the illegal program (worm W) due to the infection of worm. The worm W executed in the terminal unit 61 is transmitted to the terminal unit 11 as illegal packets during 10 to 13 o'clock (during 16 to 19 o'clock at the standard time) due to the property of the worm W described in FIG. 11A (in steps S001, S002).

(2) On the other hand, when the IDS 12 and the FW 13 are started, the IDS 12 and the FW 13 start the detection program 122 and the access control program 132, respectively, so that the detection program 122 or the access control program 132 detects the illegal packets transmitted in step S002 and collects the detected attack as an event to be transmitted to the collection unit 14 (steps S003 to S005).

(3) When the collection unit 14 is started, the collection unit 14 starts the event collection normalization program 142. The started event collection normalization program 142 receives the event transmitted in step S005 and normalizes it as the event information as described in FIG. 6 to be then registered in the event database 143 (steps S006 to S009).

(4) It is supposed that the terminal unit 81 installed in the country C 80 starts the worm W due to the infection of worm. The worm W executed in the terminal 61 is transmitted to the terminal unit 11 as illegal packets during 10 to 13 o'clock (during 20 to 23 o'clock at the standard time) due to the property of the worm W described in FIG. 11A (in steps S010, S011).

(5) The illegal packets transmitted are detected by the detection program 122 of the IDS 12 or the access control program 132 of the FW 13 in the same manner as above and the detected attack is collected as an event to be transmitted to the collection unit 14 (steps S012, S013).

(6) The collection unit 14 receives the event transmitted in step S013 by the event collection normalization program 142 and normalizes it as the event information as described in FIG. 6 to be then registered in the event database 143 (steps S014, S016).

The aforementioned processing in steps S002, S004 to S005 and S007 to S016 is repeatedly performed and a large number of events due to illegal packets transmitted are recorded in the event database 143 of the collection unit 14.

(7) Next, when the analysis unit 15 is started, the analysis unit 15 starts the log analysis program 152. The analysis unit 15 prescribes the conditions that the alert notification instruction is transmitted if numerical values (deviation index and the like) contained in the analysis information described later in FIG. 14, for example, exceed predetermined thresholds as setting of the alert generation conditions (steps S017, S018).

(8) Further, the analysis unit 15 prescribes the sampling period, host information to be analyzed and the like as described as the statistical conditions of the event statistical information described in FIG. 7, for example, as setting of the log analysis conditions. The log analysis program 152 transmits the event obtainment request as described in FIG. 6 to the collection unit 14 successively or periodically (steps S019, 020).

(9) The event collection normalization program 142 of the collection unit 14 receives the event obtainment request transmitted in step S020 and searches the event database 143 for events satisfying the obtainment conditions to transmit the number of relevant events to the analysis unit 15 as the event obtainment result as described in FIG. 6 (steps S021 to S023).

In the foregoing, the start time and the end time of the event obtainment request are set at intervals of one hour, for example, and a destination port No. 135, for example, is set in the search condition. More particularly, the time zone from the start time of 2005/01/01 00:00:00 to the end time of 2005/01/01 00:59:59 can be set to thereby obtain the number of detected events relating to the destination port No. 135 in the time zone as the event obtainment result. The event obtainment request can be transmitted at intervals of one hour like the start time 2005/01/01 01:00:00, 2005/01/01 02:00:00 and so on to thereby produce the statistical information having the sampling interval of one hour as described later.

(10) Next, the log analysis program 152 of the analysis unit 15 receives the event obtainment result transmitted in step S023 and produces the aforementioned definite example and the event statistical information as described in FIG. 7. The event statistical information is successively stored in the analysis database 153 as the event statistical information 154 (steps S024 to S026).

The event statistical information 154 obtained here has a shape as shown by observation data in case where the worms W occur in the countries A 60 and C 80 as shown in FIG. 11E when it is formed into a statistical graph for only 24 hours in the time series.

(11) The log analysis program 152 of the analysis unit 15 subjects the event statistical information 154 to the Fourier transformation processing to thereby analyze the event statistical information into plural frequency components as described in FIG. 7 (step S027).

The property of the worms W treated here has the increased strength of the frequency component expressing a cycle of one day since it is activated in the cycle of one day. The strength of the frequency component is not changed characteristically of the Fourier transformation even if the worms W occur at different timing simultaneously. For example, even when the action of worms W of the terminal units 71 and 81 in the countries B 70 and C 80 is observed, the frequency component information has the same value even if the statistical graphs shown in FIGS. 11A to 11F have quite different shapes.

(12) The frequency component information 155 obtained in the processing in step S027 is stored in the analysis database 153. The log analysis program 152 analyzes and estimates the deviation degree in frequency with respect to the frequency component information 155 and embeds its result in the analysis information described later in FIG. 14 (step S028, S029).

The deviation in frequency indicates the degree that the strength of partial frequency components out of the frequency components 1 to n of the frequency component information described in FIG. 7 is higher than that of other frequency components like dispersed values of the strength in the frequency components, for example. The fact that the deviation in the frequency components is high means that the event statistical information has certain periodicity, whereas the fact that the deviation in the frequency components is low means that the event statistical information has no periodicity.

(13) The analysis result such as the deviation in the frequency components obtained here is stored in the analysis database 153 as the analysis information 156. The log analysis program 152 judges whether an alert is notified on the basis of the analysis information 156 stored in the analysis database 153 and the previously set alert generation conditions successively or periodically or not (step S030, S031).

(14) In step S031, when it is judged that notification of the alert is necessary, the log analysis program 152 transmits the notification instruction containing the alert notification information as described in FIG. 8 to the alert notification unit 15 (step S032).

(15) On the other hand, when the alert notification unit 16 is started, the alert notification unit 16 starts the alert notification program 162 immediately thereafter (step S033). The started alert notification program 162 sets up information such as mail address or public WEB server for notifying the alert previously (step S034).

(16) When the alert notification program 162 of the alert notification unit 16 receives the alert notification instruction from the analysis unit 15 transmitted in step S032, the alert notification program 162 stores the alert notification information as described in FIG. 8 in the alert database 163 (steps S035, S036).

(17) Next, the alert notification program 162 prepares alert notification on the basis of the alert notification destination information and the alert information 164 in the alert database 163 and transmits an alert to the manager or user by means of the communication method such as mail and WEB (step S037, S038).

(18) The manager or user receives the alert notification transmitted in step S038 and confirms the occurrence state of incidents (step S039).

In the above processing, the log analysis program of the analysis unit has the function of searching the analysis information stored in the analysis database for the event statistical information having similar frequency components, so that the log analysis program can designate one piece of event statistical information to thereby display a list of event statistical information having similar frequency components in the display unit in order and can verify the similarity of all the event statistical information from the analysis information to thereby display a list of event statistical information pairs having high similarity in the display unit in order.

Further, the log analysis program of the analysis unit has the function of searching the analysis information for the event statistical information on the basis of the strength of specified frequency, so that the log analysis program can designate one or plural frequencies to thereby display a list of the event statistical information having the frequencies in the display unit in order and can search the analysis information for the event statistical information having increased strength of specified frequency to thereby display a list of event statistical information in the display unit in order.

Figure 14:
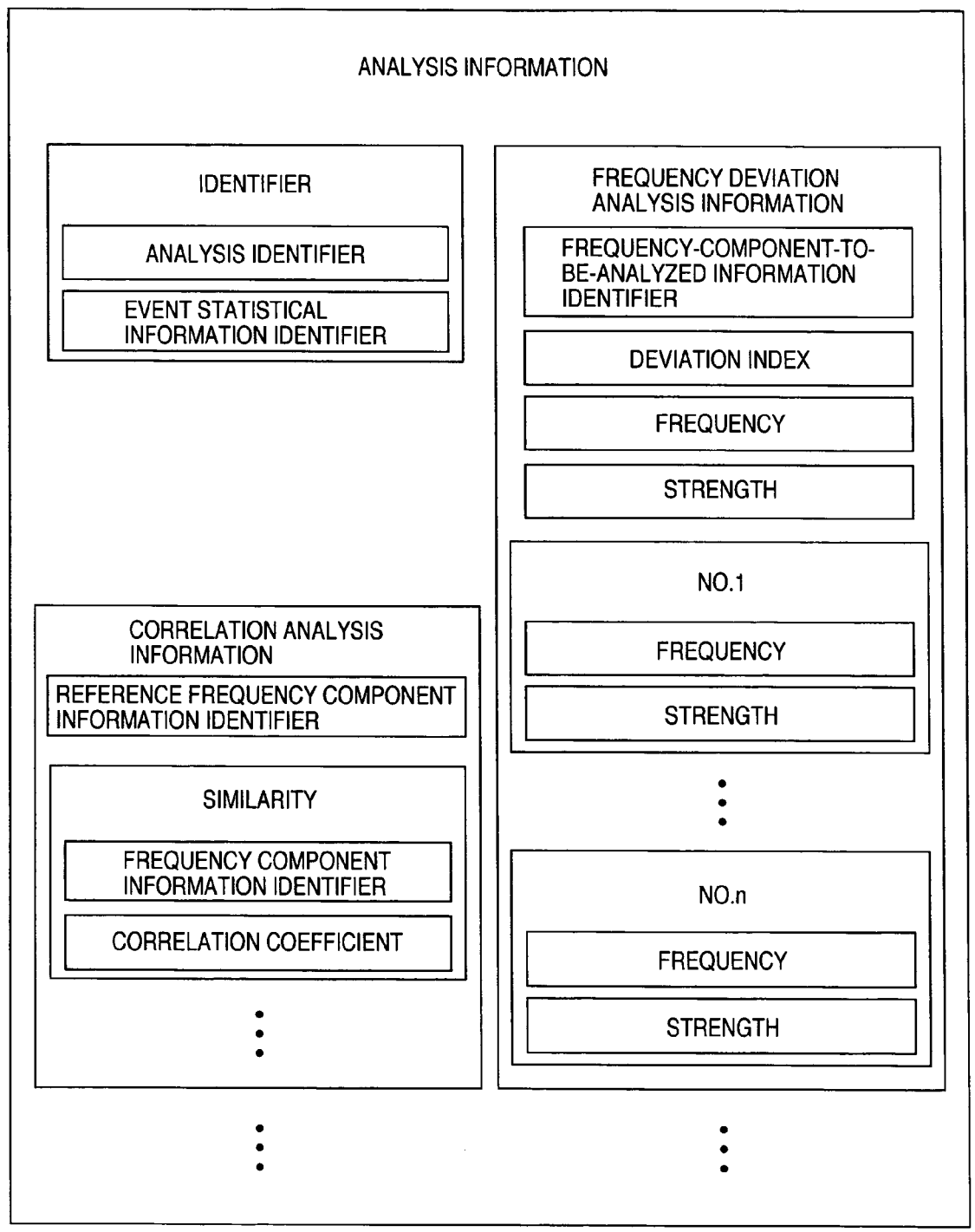
FIG. 14 illustrates the format example of analysis information obtained as a result of analysis by the analysis unit.

FIG. 14 shows an example of the format of the analysis information obtained as the analysis result by the analysis unit.

The analysis information is information produced by the processing in step S029 in the above-mentioned flow performed by the log analysis program 152 and is to analyze and estimate the deviation degree in frequency with respect to the frequency component information 155. The frequency deviation analysis information includes frequencies and strength thereof of the frequency components 1 to n of the frequency component information, deviation index, frequency and strength for the frequency-component-to-be-analyzed information identifier.

As described above, according to embodiment of the present invention, the analysis unit can confirm the occurrence state of illegal action even if attacks are made simultaneously by the plurality of terminal units that perform illegal action such as worm. Further, since the analysis information is stored in the analysis database of the analysis unit, the event statistical information having the same properties as the specific incident can be searched for immediately. In other words, for example, when the incident relating to the port No. 445 has the same properties as the specific incident or when the incident occurred with the same condition one month ago has the same properties as the specific incident, such incident can be detected immediately, so that it is possible to effectively detect the incident that cannot be detected exactly by observation of the statistical graph obtained before now or comparison with past patterns.

Each processing in the embodiment of the present invention can be constituted by programs and executed by a CPU provided in a computer. The programs can be stored in recording media such as FD, CDROM and DVD to be provided in the form of recording media or provided as digital information through a network.

The specification and drawings are, accordingly, to be regarded in an illustrative rather than a restrictive sense. It will, however, be evident that various modifications and changes may be made thereto without departing from the spirit and scope of the invention as set forth in the claims.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A log analysis system for analyzing a state of incidents occurred in a network and comprising a security unit connected to the network, a collection unit connected to the security unit and an analysis unit connected to the collection unit;

the security unit including detection means for detecting illegal packets flowing in the network and first transmission means for transmitting event information concerning the packets to the collection unit when illegal packets are detected;

the collection unit including event database storage means for obtaining the event information from the security unit to be stored therein, first search means for receiving from the analysis unit an event obtainment request message for obtaining events occurred in a specified period and coincident with specified conditions to search the event database for the events having the specified conditions, and second transmission means for transmitting the searched events to the analysis unit;

the analysis unit including third transmission means for transmitting the event obtainment request message to the collection unit, analysis means for analyzing the event information obtained from the collection unit in response to the event obtainment request message, analysis database means for storing information of the analyzed result, event statistical information preparation means for preparing event statistical information on the basis of the obtained event information, frequency component information preparation means for subjecting the prepared event statistical information to frequency analysis processing to prepare frequency component information including frequency information and strength information, and decision means for making analysis on the basis of the frequency component to judge occurrence tendency of incidents.

2. A log analysis system according to claim 1, further comprising an alert notification unit for notifying the result analyzed by the analysis unit to a relevant network manager or user.

3. A log analysis system according to claim 1, wherein the analysis unit includes second search means for searching the analysis information for the event statistical information having similar frequency components and first display means for designating one of the event statistical information to thereby display a list of event statistical information having similar frequency components in a display unit in order.

4. A log analysis system according to claim 1, wherein the analysis unit includes verification means for verifying, based on the frequency component information, similarity of all the event statistical information out of the analysis information and second display means for displaying a list of event statistical information pairs having high similarity in a display unit in order.

5. A log analysis system according to claim 1, wherein the analysis unit includes third search means for searching the analysis information for the event statistical information based on strength of specified frequency and third display unit for designating one or plural frequencies to thereby display a list of event statistical information having the frequency in a display unit in order.

6. A log analysis system according to claim 1, wherein the analysis unit includes fourth search means for searching the analysis information for the event statistical information frequency strength of which is not uniform, based on the frequency component information, and fourth display means for displaying a list of event statistical information in a display unit in order.

7. The log analysis system according to claim 1, wherein the event obtainment request message including obtainment condition with at least one of information on an occurrence period of the event to be searched for, source IP address, source port number, destination IP address, destination port number, protocol, detection type or detection unit identifier recorded in the event.

8. A log analysis method in a log analysis system for analyzing a state of incidents occurred in a network;
the log analysis system comprising a security unit, a collection unit and an analysis unit;
the log analysis method comprising:
a step of, in the security unit, detecting illegal packets flowing in the network and transmitting event information to the collection unit when illegal packets are detected;
a step of, in the collection unit, obtaining event information from the security unit to be stored in an event database and receiving an event obtainment request from the analysis unit to search the event database for event having specified conditions and transmit the searched event to the analysis unit; and
a step of, in the analysis unit, transmitting a request for obtaining events occurred in a specified period and coincident with specified conditions to the collection unit and analyzing the event information obtained from the collection unit in response to the request to store information of the analyzed result in an analysis database, preparing event statistical information on the basis of the obtained event information, subjecting the prepared event statistical information to frequency analysis processing to prepare frequency component information including frequency information and strength information, making analysis based on the frequency component to judge occurrence tendency of incidents.

9. A log analysis method according to claim 8, wherein the log analysis system further comprises an alert notification unit, and the analysis unit produces alert information expressing the occurrence tendency of incidents as table and graph after the analysis unit judges the occurrence tendency of incidents on the basis of the frequency component information and transmits the alert information to the alert notification unit, the alert notification unit notifying the received alert information to a network manager or user.

10. A log analysis method according to claim 8, wherein the analysis unit expresses similarity between the frequency component information produced from one piece of the event statistical information and that produced from other event statistical information as numerical correlation values and ranks the event statistical information in order on the basis of the obtained correlation values to be displayed.

11. A log analysis method according to claim 8, wherein the analysis unit searches the frequency component information for that frequency strength of which is not uniform, based on the frequency component information, and ranks the event statistic information relative to the frequency component in order on the basis of the strength to be displayed.

12. A log analysis apparatus for analyzing a state of incidents occurred in a network, comprising:
means for transmitting a request for obtaining events occurred in a specified period and coincident with specified conditions to a collection unit which obtains from a security unit event information which the security unit obtains by detecting illegal packets flowing in the network and stores the event information in an event database;
means for analyzing the event information obtained from the collection unit in response to the request;
an analysis database for storing information of the analyzed result;
means for preparing event statistical information on the basis of the obtained event information;
means for subjecting the prepared event statistical information to frequency analysis processing to prepare frequency component information including frequency information and strength information; and
means for making analysis based on the frequency component to judge occurrence tendency of incidents.

* * * * *